(12) United States Patent
Zhang et al.

(10) Patent No.: US 11,446,814 B2
(45) Date of Patent: Sep. 20, 2022

(54) ELECTROMAGNETIC DRIVE SPHERICAL ROBOTIC WRIST WITH TWO DEGREES OF FREEDOM AND CONTROL METHOD THEREFOR

(71) Applicant: DALIAN UNIVERSITY OF TECHNOLOGY, Liaoning (CN)

(72) Inventors: Yongshun Zhang, Liaoning (CN); Dianlong Wang, Liaoning (CN); Zhenqiang Yang, Liaoning (CN); Pengzhi Jia, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 17/286,780

(22) PCT Filed: Jun. 1, 2020

(86) PCT No.: PCT/CN2020/093737
§ 371 (c)(1),
(2) Date: Apr. 19, 2021

(87) PCT Pub. No.: WO2021/243515
PCT Pub. Date: Dec. 9, 2021

(65) Prior Publication Data
US 2022/0040850 A1    Feb. 10, 2022

(51) Int. Cl.
*B25J 9/12*    (2006.01)
*B25J 17/02*    (2006.01)
(52) U.S. Cl.
CPC .............. *B25J 9/12* (2013.01); *B25J 17/02* (2013.01); *B25J 17/0275* (2013.01)

(58) Field of Classification Search
CPC ........... B25J 9/12; B25J 17/02; B25J 17/0275
See application file for complete search history.

(56) References Cited

FOREIGN PATENT DOCUMENTS

| CN | 1944003 A | 4/2007 |
|---|---|---|
| CN | 100590963 C | 2/2010 |
| CN | 102029614 A | 4/2011 |
| CN | 102579048 B | 6/2013 |
| CN | 103341865 A | 10/2013 |
| CN | 103341865 B | 6/2015 |
| CN | 204819561 U | 12/2015 |
| CN | 105598997 A | 5/2016 |

(Continued)

*Primary Examiner* — William C Joyce
(74) *Attorney, Agent, or Firm* — Muncy, Geissler, Olds & Lowe, P.C.

(57) ABSTRACT

An electromagnetic drive spherical robotic wrist with two degrees of freedom and a control method therefor, which is particularly a highly integrated active spherical robotic wrist, realizes pitch and yaw rotation with two degrees of freedom under the direct drive of a coaxial following magnetic torque of a spatial universal rotational magnetic field through a built-in permanent magnet cylinder with radial magnetization of a following mechanism formed by coaxial connection of two output ends of internal and external universal joints with the same rotation center. The electromagnetic drive spherical robotic wrist overcomes the disadvantages of a complex transmission mechanical wrist, and a wrist transmission system has a simple and light structure, high transmission efficiency, good static and dynamic performance, and fast control response.

2 Claims, 6 Drawing Sheets

(56) References Cited

FOREIGN PATENT DOCUMENTS

| | | | |
|---|---|---|---|
| CN | 105662318 A | | 6/2016 |
| CN | 104983385 B | | 1/2017 |
| CN | 105662318 B | | 1/2018 |
| CN | 110171015 A | | 8/2019 |
| EP | 0113267 A1 | | 7/1984 |
| FR | 2537301 | * | 12/1982 |
| JP | S62-221856 A | | 9/1987 |

* cited by examiner

ELECTROMAGNETIC DRIVE SPHERICAL ROBOTIC WRIST WITH TWO DEGREES OF FREEDOM AND CONTROL METHOD THEREFOR

TECHNICAL FIELD

The present disclosure belongs to the technical field of automation engineering, and relates to an electromagnetic drive spherical robotic wrist with two degrees of freedom and a control method therefor, which is particularly a highly integrated active spherical robotic wrist that realizes pitch and yaw rotation with two degrees of freedom under the direct drive of a coaxial following magnetic torque of a spatial universal rotational magnetic field through a built-in permanent magnet cylinder with radial magnetization of a following mechanism formed by coaxial connection of two output ends (driven fork) of an internal and an external universal joints with the same rotation center.

BACKGROUND

Robots used in dangerous and extreme environments have strict requirements for performance indexes of wrists, for example, space robots have the distinguishing features of compact structure, high integration level and large power-to-inertia ratio. Space robots are playing an increasingly important role in tasks such as maintenance of spacecraft and space stations, and can complete tasks such as controlling a spacecraft, opening a hatch, assembling space modules and maintaining a spacecraft in lieu of astronauts. Wrist is an important basic component connecting arm and hand, and the performance thereof has direct influence on location accuracy, flexibility and operation functions of an end effector of a robot. The robotic wrist has the function of changing the posture of the end effector in space through local minor adjustment to achieve accurate positioning, the degree of freedom and the scope of posture of the wrist have direct influence on flexibility, stability and location accuracy of the robot, six degrees of freedom are required for control of any position and posture of the robot, the wrist has at least two degrees of freedom and is located at the front end of an arm, and the weight of the wrist constitutes the additional load of the forearm and thus increases energy consumption. The wrist realizes two-axis rotation in narrow space, so the mechanism design of the wrist is complex and has multiple variable parameters, and the performance indexes of the wrist have become the main bottleneck that limits the application and expansion of the robot in space and other extreme environments.

At present, the robotic wrist cannot fully meet the requirements of space operation, the transmission of the multi-degree of freedom motion thereof generally adopts gear drive, the structure is complex, the integration level is low, and the problem of motion coupling exists so that the flexibility, posture adjustment capability and accurate positioning capability of the end effector are limited, and complex contact operation such as opening a spacecraft hatch still cannot be completed through wrist adjustment.

Structurally, the robotic wrist can be basically divided into three categories: 1) spherical wrist of which three joint axes intersect at one point and the position and posture are decoupled, the inverse kinematic analysis is simple, the structure is compact and the power-to-inertia ratio is large, so space robots and other robots used on special occasions mostly adopt spherical wrists. Due to the limitations of the mechanical structure, this wrist is difficult in design and complex in structure, the weight thereof is difficult to reduce, and the work space is small; 2) non-spherical wrist of which three axes do not intersect at one point and which overcomes the limitations of the mechanical structure, the rotation angle of each joint can reach more than 360°, and the disadvantages lie in that the structure is not compact, the volume is large, the improvement of the power-to-inertia ratio is limited, the motion cannot be decoupled and the control accuracy is low; and 3) wrist with parallel structure, which is actually a miniaturized parallel mechanism.

For a tele-robot wrist module for assembly of space stations, which was developed by the Martin Marietta and the NASA space flight center in 1991, the motor arrangement adopts separation modes of pitch, yaw and rotation, but the structure is not compact, the power-to-inertia ratio is small, the motion of three joints is not decoupled, and the control accuracy is low.

Graco Robotics, Inc. developed a compact universal wrist with double universal joints in 1991, the helical gear transmission thereof is ensured by guiding of an anti-pitch cam mechanism moving in a gear slide rail, which overcomes the disadvantages of small power-to-inertia ratio and poor structure strength of previous wrists, pitch and yaw are respectively driven by two intersecting universal joint rotating shafts so that the structure is more compact, but the wrist has the disadvantages of complex structure and great difficulty in processing, and the helical gear of the wrist has an unstable phenomenon of jumping under the action of load.

NASA develops a new generation of wrist module of which the transmission system uses three parallel screw drives to realize pitch and yaw rotation, simplifying design and reducing cost. As the additional flexibility is applicable to unstructured environments, the NASA Jet Propulsion Laboratory has successfully applied the universal wrist to handling of dangerous goods. However, the wrist has the disadvantage that three drives are required to realize pitch and yaw rotation.

Operationally, robot operation can be divided into two categories: contact and non-contact, the former is that the robot moves in free space independently of the external environment, simple position control is adopted, and the position control of the robot is only suitable for operation in structured and modeled environments; and the latter is constrained by the external environment, for example, the space robot opens the hatch, performs assembly and rotates the crank. Robots performing operation such as grasping, installing and positioning in an unmodeled environment has the obvious feature of contact operation, and the wrist thereof shall has the variable stiffness compliance control performance to avoid damaging arms during contact operation.

For the contact operation, the position control alone is not enough, because the operation environment has an impact on the contact force against the robot, and the minor position deviation of the end thereof may lead to a large contact force, which easily damages the arm or the operation target. Therefore, it is not easy to grasp the target in the unmodeled environment. At present, wrists such as space arm are not fully capable of contact operation in an unstructured and unmodeled environment.

So far, compliance control is mainly divided into an active mode and a passive mode. The way in which robots actively control forces by processing force feedback information and adopting certain control strategies is called active compliance control. On the contrary, the way in which robots are naturally obedient to an environment without force feedback but only with compliant mechanism such as machinery is called passive compliance control. Active compliance control is divided into active impedance control and force/position hybrid control. The force/position hybrid control method is highly dependent on external environment dynamics and requires detailed task description. The research on passive compliance control is mainly realized by a mechanical device or a specially designed passive compliance mechanism such as RCC elastic accessory of robotic wrist. The disadvantage is the addition of additional mechanical devices, which makes the wrist mechanism become complicated and cumbersome and has poor adaptability.

A spherical active drive robotic wrist with two degrees of freedom and an active compliance control method are presented in South Korea. The lower hemispherical motion thereof is realized by gear drive, the upper hemispherical motion is transmitted by the internal universal joint, and two offset bevels are combined into pitch and yaw rotation of the wrist. The structure is compact and simple, the decoupling of two input motions is realized, and the transmission torque is controlled by the engagement degree of the clutch so that the wrist becomes a passive wrist under the action of a certain torque, which plays the roles of protecting against overload and avoiding mechanical interference and damage to the wrist.

Dalian University of Technology proposes a constant rotation decoupling active space spherical wrist with three degrees of freedom and a universal compliance control method (patent number: ZL201310282753.1), which is a typical active compliance control method that can realize functions of active and passive wrists specifically through friction compensation. The spherical wrist is in a full compliance state in a passive mode to avoid damaging arms during contact operation. However, the nonlinear friction model of the robot joint is difficult to accurately determine, the accuracy of friction compensation will directly affect the compliance control effect, and the three axis rotation control process of the wrist is complex.

In conclusion, due to high complexity of the mechanical system of the robot wrist, the friction of the motion transmission system has nonlinear characteristics, which eventually leads to the problems of poor dynamic performance, low control accuracy, low mechanical efficiency, poor reliability and so on of the wrist with a mechanical structure. Especially, contradiction exists between the complex transmission structure of the mechanical wrist and the realization of active compliance control, which leads to large difficulty of compliance control and low response speed. Because the traditional mechanical wrist reducer system has reverse transmission self-locking feature of output end, the active control moment must be applied to eliminate joint friction during contact operation to remove self-locking so as to realize compliance control. However, due to complex nonlinear friction of the joint reducer system, the compliance control function of the mechanical joint is poor and the arm is easily damaged.

To overcome the disadvantages of the above mechanical transmission wrist, make the structure of the wrist transmission system with multiple degrees of freedom simple and portable and significantly improve motion performance, transmission efficiency, control response speed and location accuracy, an electromagnetic direct drive motor with multiple degrees of freedom can be used to replace a complex transmission mechanical wrist. The motor with multiple degrees of freedom has high integration level, simple transmission, no mechanical clearance, and high utilization rate of effective materials and control system components, especially multiple degrees of freedom of rotation, which can significantly simplify the structure of the mechanical system, avoid the nonlinear friction of joints, and improve the static and dynamic performance of the system.

A spherical motor is a high technology which integrates modern motor design theory, power electronics technology and automatic control theory, and is a direct drive spherical active joint. According to the principle, the spherical motor can be divided into the following categories: selsyn mode, induction mode, permanent magnet mode (DC mode, step mode, magnetic resistance mode, synchronous mode) and so on. The disadvantages of a coil spherical motor are overcome. The permanent magnet spherical motor has low space usage, high system efficiency and high magnetic energy product and has a good application prospect in the field of multi-dimensional space servo control system such as robot, multi-direction transmission mechanism and manufacturing industry.

At present, an electromagnetic drive spherical motor has the following problems in structural design of main body, analysis and control of electromagnetism and torque and so on: 1) difficulty in magnetic field calculation. The magnetic field of the spherical motor is a three-dimensional magnetic field which is extremely complicated. At present, the magnetic field calculation of the spherical motor is based on an idealized hypothesis model, and the magnetic field cannot be accurately modeled and calculated. 2) electromagnetic coupling. The electromagnetic coupling and mechanical coupling relationships between degrees of freedom of the spherical motor are complex, and how to quantitatively analyze the coupling relationships and realize precise decoupling according to the magnetic field model is an urgent problem to be solved in the research on design and accuracy control of the spherical motor. 3) Optimization of structural parameters of a novel spherical motor. The structural parameters of the spherical motor body must be optimized on the basis of precise modeling of the spherical motor to improve the output torque, reduce the size and improve the response sensitivity and location accuracy.

To solve the above problems, it is necessary to innovate the principle of electromagnetic drive spherical robotic joints. A new spherical motor must facilitate the establishment of accurate mechanical models and motion models, and to find out an appropriate path planning algorithm and to improve the dynamic performance and stability of the motor are the basis of precision control on the spherical motor and also the inevitable requirement that the spherical motor can be applied to the field of precision industry.

To realize the innovation of the principle of the electromagnetic drive spherical robotic joint, the technology of the spatial universal rotational magnetic field must be broken through first. Because the spatial universal rotational magnetic field is only a uniform rotating magnetic field generated by three axis orthogonal (square) Helmholtz coils, neither magnetic coupling problem nor magnetic force coupling problem exists, and magnetic poles are only under the action of pure electromagnetic driving torque which is convenient to establish accurate mechanical models and motion models, the technology of the spatial universal rotational magnetic field has obvious advantages. However, the orientation and rotation direction control of the rotational magnetic field is the key point.

To enable a capsule robot to walk freely in the curved intestinal environment, the national invention patent "universal rotational magnetic field drive control method for internal medical micro robot" (patent authorization number: ZL 200810011110.2) proposes a control method for a spatial universal rotational magnetic field with an adjustable rotation axis, and provides a rotational magnetic field basic sine current superposition formula applicable to a first quadrant of space.

To realize the universal adjustable axis of the rotational magnetic field, the basic sine current superposition formula is extended to the other seven quadrants of space. In the national invention patent "control method for orientation and rotating direction of rotation axis of spatial universal superposition rotational magnetic field" (patent authorization number: ZL 201210039753.4), the unique control on the orientation and rotating direction of the rotation axis of the spatial universal rotational magnetic field in each quadrant of a space coordinate system is realized on the basis of the combined drive mode of three-phase sine current signal in term of antiphase current in the basic sine current superposition formula with three direction angles of a fixed magnetic field rotation axis in space as input variables and the change rule of the orientation and rotating direction of the rotation axis of the spatial universal uniform rotational magnetic field superposed in the three axis orthogonal nested Helmholtz coil device, which theoretically solves the problem of arbitrary adjustment of orientation, rotating direction, strength and revolving speed of spatial universal rotating magnetic vector by digital control and lays a foundation for posture adjustment and directional walk driving of the robot.

To solve the problem that two motion modes of posture adjustment and walking of the capsule robot during examination in gastrointestinal tract separate from each other, in the national invention patent "dual hemisphere capsule robot with active and passive modes and posture adjustment and turning drive control method therefor" (patent authorization number: ZL 201510262778.4), the rolling motion of the spherical robot during posture adjustment is avoided with flexibility and universality of the spherical structure, and in combination with the spatial universal rotational magnetic field, the dual hemisphere capsule robot with active and passive modes can freely make posture adjustment, turn and walk in vivo. Researches show that the orientation and end circular trajectory error of the spatial universal rotational magnetic field have direct influence on the control accuracy of the robot. The posture adjustment and control of the dual hemisphere capsule robot by the spatial universal rotational magnetic field lays a foundation for the development of the spherical robotic wrist with two degrees of freedom.

To realize human-computer interactive control of the spatial universal rotational magnetic field, in the national invention patent "human-computer interactive control method for spatial universal rotational magnetic field" (patent authorization number: ZL 201610009285.4), a spatial universal rotational magnetic field superposition formula of current form with two posture angles of yaw and pitch angles as input variables in a latitude and longitude coordinate system is proposed, $$\begin{bmatrix} I_x \\ I_y \\ I_z \end{bmatrix} = \begin{bmatrix} I_0\sqrt{1 - \sin^2\theta\cos^2\delta} \sin(\omega t - \varphi_x) \\ -I_0\sqrt{1 - \cos^2\theta\cos^2\delta} \sin(\omega t + \varphi_y) \\ I_0\cos\delta\sin(\omega t + \pi/2 \end{bmatrix} \quad (1)$$

wherein tan $\varphi_x$=tan $\theta$ sin $\delta$, and tan $\varphi_y$=cot $\theta$ sin $\delta$, $\theta$ and $\delta$ are a yaw angle and a pitch angle of the robot axis, $I_0$ is the amplitude of sine current in three axis orthogonal (square) Helmholtz coils, $\omega$ is the angular frequency at which the sine signal current is applied, and the frequency at which the sine signal current is applied is f=$2\pi/\omega$. The three-dimensional superposition problem of the spatial universal rotational magnetic field is transformed into the two-dimensional superposition problem in a plane, and the yaw angle and the pitch angle are separately controlled through two joysticks to realize the interactive control of low-dimensional separable variables. The three axis orthogonal (square) Helmholtz coil is driven to generate the spatial universal rotational magnetic field using control mode of orientation separable variables of the yaw angle and the pitch angle of the robot axis, which can fully realize control on the yaw angle and the pitch angle of a novel wrist.

To realize the innovation of the principle of the electromagnetic drive spherical robotic joint, it is necessary to solve the novel electromagnetic drive technology which is more efficient, swift and accurate actuated by the spatial universal uniform rotational magnetic field. During the process of studying the posture control of the capsule robot, it is found that the axis of permanent magnet cylinder with radial magnetization driven by the universal rotational magnetic field will have coaxial following magnetic torque effect of the rotational magnetic field, i.e., when an included angle exists between the axis of permanent magnet cylinder and the rotation axis of the rotational magnetic field, the coaxial following magnetic torque of the rotational magnetic field will pull the axis of permanent magnet cylinder to rotate toward the direction of the rotation axis of the rotational magnetic field until coinciding. The coaxial following magnetic torque of the spatial universal rotational magnetic field can guide the axis of the permanent magnet cylinder to any spatial orientation, which lays a foundation for electromagnetic drive of posture transformation of the spherical joint.

To realize the online stiffness adjusting function of the robotic motion joint, domestic and foreign researchers carry out various structural designs, and through the investigation on domestic and foreign variable stiffness flexible joint structure, the variable stiffness flexible joint is divided into two models: bar linkage and cam mechanism according to the structure principle. The robot and electromechanical integration association of German Aerospace Center develops a variable stiffness joint (VS. Joint) based on the cam mechanism, and joint rotation is used to drive the position change of the cam roller in the bottom cam disc to change the amount of compression of the spring, achieving variable stiffness flexible output of the joint. The second generation of floating spring joint (FSJ) is applied in a novel DLR arm system. The number of cam rollers in each groove of the mechanism is increased from one to two, thereby achieving low friction and low energy consumption, and increasing the load bearing capacity. The variable stiffness actuator CompAct—VSA developed by TSAGARAKIS et al. from Italian Institute of Technology uses rack and pinion drive to change the position of the rotation axis of the cam-shaped lever arm, and the cam changes the output stiffness of the mechanism through the action of the roller and the spring. In a word, the mechanical variable stiffness adjusting mechanism has large volume, complex structure and poor practical application. If the complex mechanical structure can be got rid of and the linearized control of variable stiffness is realized directly by the electromagnetic drive of the joint, the dynamic performance of the compliance control of the joint will be significantly improved.

For the limitations such as complex mechanical structure, mechanical friction, variable stiffness control and difficulty in compliance control of the above mechanical wrist, in combination with the drive principle of the coaxial following magnetic torque effect of the rotational magnetic field, the present disclosure proposes a highly integrated active spherical robotic wrist with two degrees of freedom that realizes pitch and yaw rotation under the guidance of a coaxial following magnetic torque of a spatial universal rotational magnetic field through a built-in permanent magnet cylinder with radial magnetization of a following mechanism formed by coaxial connection of two output ends (driven fork) of an internal and an external universal joints with the same center and a variable stiffness control method which is a method for realizing variable stiffness and compliance control of the spherical wrist under the condition of contact operation by the electromagnetic drive feed-forward compensation approach in terms of control. Active and passive wrist functions can be realized through the electromagnetic drive feed-forward compensation approach. Through the active control on pitch and yaw rotation, the end of the effector is positioned and the hatch is pulled. As an interference between the motion trajectory of the end effector of the robot and the rotating circular trajectory of the hatch occurs when the hatch is opened, and the direction of the force applied by the hatch on the wrist is known, according to the direction known beforehand, the universal rotational magnetic field is applied, and the moment compensation is applied so that the motion trajectory of the end effector of the robot is in the plane across the force direction of the end effector of the wrist, and the wrist becomes a loose passive wrist to avoid interference so as to smoothly realize complex operation such as opening a hatch.

According to the mastered information and the novelty search for project approval, at present, no report on the related information of a novel electromagnetic drive spherical wrist adopting coaxial following magnetic torque effect of the spatial universal rotational magnetic field is found at home and abroad, and no report on the operating modes of active and passive wrists realized by electromagnetic torque is found, so the present disclosure has prominent originality.

SUMMARY

To solve the above problems, the present disclosure provides an active spherical robotic wrist with two degrees of freedom that realizes pitch and yaw rotation of the output end under the direct guidance and drive of a coaxial following magnetic torque of a spatial universal rotational magnetic field through a built-in permanent magnet cylinder actuator with radial magnetization of a following mechanism formed by coaxial connection of two output ends (driven fork) of an internal and an external universal joints with the same center, and also provides a method for realizing variable stiffness and compliance control of the spherical wrist under the condition of contact operation by the electromagnetic drive feed-forward compensation approach.

The technical solution of the present disclosure is:

An electromagnetic drive spherical robotic wrist with two degrees of freedom, comprises a three axis Helmholtz coil assembly a and a rotor following unit b, wherein the three axis Helmholtz coil assembly a provides a spatial universal rotational magnetic field, and the rotor following unit b provides pitch and yaw rotation with two degrees of freedom under the drive of a coaxial following magnetic torque of the rotational magnetic field; and the specific structure is as follows:

The rotor following unit b comprises an internal cross universal joint d, an external cross universal joint c and a fixed end e; and the fixed end e is provided with a fixed end support seat 5 at the top, the fixed end support seat 5 is divided into four vertical support frames on the same axis, the support frames are provided with horizontal holes, the two vertical support frames in the middle are used for installing the internal cross universal joint d, and the two vertical support frames on outer ends are used for installing the external cross universal joint c;

The internal cross universal joint d comprises the two vertical support frames (drive fork) in the middle of the fixed end support seat 5, an internal universal joint inner ring 14 and a cylindrical case 2, wherein the internal universal joint inner ring 14 is used as a cross shaft bracket, and the cylindrical case 2 is used as a driven fork; both sides of the internal universal joint inner ring 14 are respectively installed in the holes of the two vertical support frames in the middle of the fixed end support seat 5 by a deep groove ball bearing a 15 and a deep groove ball bearing b 16, and the fixed end support seat 5 and the internal universal joint inner ring 14 realize relative rotation, forming a pitching rotating shaft; the cylindrical case 2 is located in the internal universal joint inner ring 14, a connecting shaft d 23 and a connecting shaft e 26 are respectively symmetrically fixed on both sides of the cylindrical case 2 at one end, and are respectively installed on the inner side of the internal universal joint inner ring 14 through a deep groove ball bearing c 24 and a deep groove ball bearing d 25 at the other end, and the cylindrical case 2 and the internal universal joint inner ring 14 realize relative rotation, forming a yawing rotating shaft; and a permanent magnet cylinder with radial magnetization 1 is installed in the cylindrical case 2 through a bearing 31;

The external cross universal joint c comprises the two vertical support frames on outer ends of the fixed end support seat 5, an external universal joint inner ring 3 and an external universal joint outer ring 17, wherein the external universal joint inner ring 3 is used as a cross shaft bracket, the external universal joint inner ring 3 is symmetrically provided with four coaxial horizontal holes (cross shaft holes), and the external universal joint outer ring 17 is used as a driven fork; a connecting shaft a 7 and a connecting shaft b 9 are respectively installed in the holes of the two vertical support frames on outer ends of the fixed end support seat 5 by a flange bearing a 8 and a flange bearing b 10; the coaxial holes on two sides of the external universal joint inner ring 3 are respectively fixedly connected to the connecting shaft a 7 and the connecting shaft b 9 through a general flat key a 6 and a general flat key b 11, and the fixed end support seat 5 and the external universal joint inner ring 3 realize relative rotation, forming a pitching rotating shaft; the connecting shaft a 7 is connected to an encoder a 4 at the outer end, the connecting shaft b 9 is connected to an damper a 12 at one end and is connected to a brake a 13 at the other end, and the encoder a 4, the damper a 12 and the brake a 13 are all fixed on the fixed end support seat 5; a connecting shaft c 21 and a connecting shaft f 28 are respectively installed in the coaxial holes on the other two sides of the external universal joint inner ring 3 through a flange bearing c 22 and a flange bearing d 27; the external universal joint outer ring 17 is symmetrically composed of two support rods with a semi-annular structure, the two support rods are respectively fixedly connected to the connecting shaft c 21 and the connecting shaft f 28 through a general flat key c 20 and a general flat key d 29 at one end, the ends of the support rods are located outside the external universal joint inner ring 3, and the two support rods are fixed on both sides of an output end 33 at the other end; the external universal joint outer ring 17 and the external universal joint inner ring 3 realize relative rotation, forming a yawing rotating shaft; a connecting rod 32 is fixed on the top of the cylindrical case 2 at one end, and is fixedly connected to the output end 33 at the other end; and the connecting shaft c 21 is respectively connected to an encoder b 18 and a brake b 19 at both ends, the connecting shaft f 28 is connected to a damper b 30 at the outer end, and the encoder b 18, the brake b 19 and the damper b 30 are all fixedly fixed on the outer side of the external universal joint inner ring 3;

The three axis Helmholtz coil assembly a comprises a large coil assembly, a small coil assembly and a middle coil assembly, and each assembly comprises two identical coils which are arranged symmetrically; axes of the three coil assemblies are perpendicular to each other, and the three coil assemblies are fixed to each other, wherein the large coil assembly is fixed on the fixed end e at the bottom, and the axis of the middle coil assembly is coincident with the axis of the fixed end e; the internal cross universal joint d is located in an internal space in the center of the three coil assemblies, and the external cross universal joint c is located outside the three coil assemblies; and the external cross universal joint c, the three axis Helmholtz coil assembly a and the internal cross universal joint d spatially form a three layers nested structure.

The present disclosure has the following effects and benefits:

The two input ends and two output ends of the internal and external universal joints of the novel electromagnetic drive spherical robotic wrist with two degrees of freedom are respectively coaxially connected in parallel, the internal and external universal joints have the same rotation center so that a spherical wrist is formed, the motion decoupling of the wrist with two degrees of freedom is realized and the yaw angle and the pitch angle can be measured and controlled separately. The internal and external universal joints both have a hollow structure, which can increase the internal nestable accommodation space. The yaw angle and the pitch angle of the end effector connected to the output end of the wrist can be controlled, but the rotation angle does not deflect all the time, which is convenient for adjusting the normal direction of the end effector to position the wrist.

The present disclosure overcomes the disadvantages of a complex transmission mechanical wrist, and a wrist transmission system has a simple and light structure, high transmission efficiency, good static and dynamic performance, and fast control response. The transmission is simple without mechanical clearance, so the location accuracy is high. As no nonlinear friction force of a complex mechanical transmission system is generated, variable stiffness control and compliance control of the wrist can be realized quickly by direct electromagnetic drive.

The present disclosure overcomes the modeling problem of a three-dimensional complex magnetic field of the existing electromagnetic drive spherical joint, realizes the precise modeling and calculation of a magnetic field, quantitatively analyzes the electromagnetic coupling and mechanical coupling relationships between degrees of freedom of the electromagnetic drive joint, realizes precise decoupling and structural parameter optimization, and will finally realize the control response sensitivity and location accuracy of the electromagnetic drive spherical joint.

In the figures: a three axis Helmholtz coil assembly; b rotor following unit; c external cross universal joint; d internal cross universal joint; e fixed end; f end effector; g force sensor; and h robotic wrist with two degrees of freedom.

1 permanent magnet cylinder with radial magnetization; 2 cylindrical case; 3 external universal joint inner ring; 4 encoder a; 5 fixed end support seat; 6 general flat key a; 7 connecting shaft a; 8 flange bearing a; 9 connecting shaft b; 10 flange bearing b; 11 general flat key b; 12 damper a; 13 brake a; 14 internal universal joint inner ring; 15 deep groove ball bearing a; 16 deep groove ball bearing b; 17 external universal joint outer ring; 18 encoder b; 19 brake b; 20 general flat key c; 21 connecting shaft c; 22 flange bearing c; 23 connecting shaft d; 24 deep groove ball bearing c; 25 deep groove ball bearing d; 26 connecting shaft e; 27 flange bearing d; 28 connecting shaft f; 29 general flat key d; 30 damper b; 31 bearing; 32 connecting rod; and 33 output end.

DETAILED DESCRIPTION

Specific embodiments of the present disclosure are described below in detail in combination with the technical solution and accompanying drawings.

Figure 1:
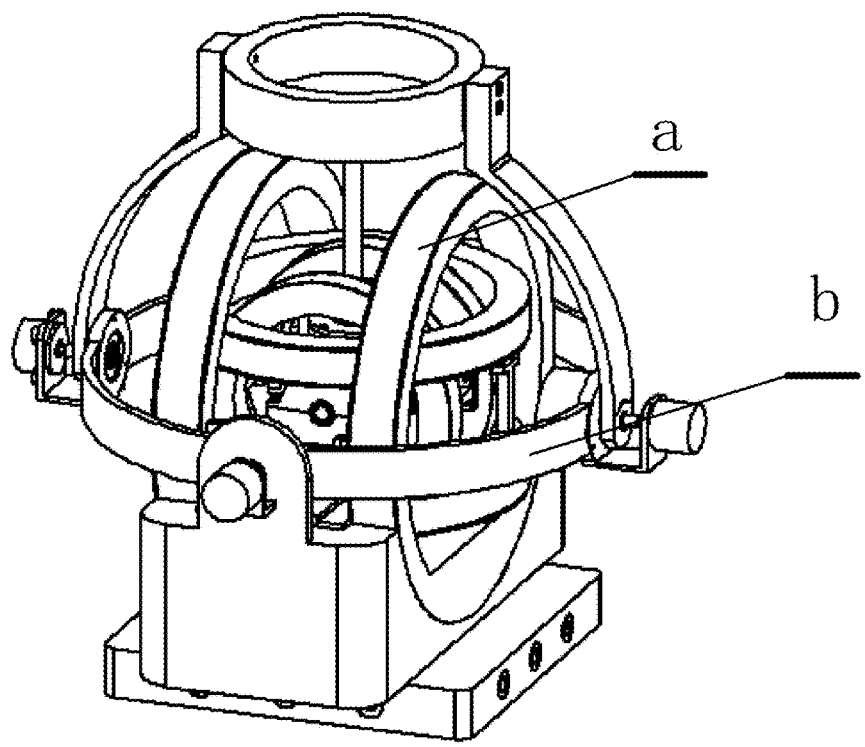
FIG. 1 is a structural schematic diagram of a robotic wrist of the present disclosure.

As shown in FIG. 1, the spherical robotic wrist with two degrees of freedom of the present disclosure comprises a three axis Helmholtz coil assembly a and a rotor following unit b. The three axis Helmholtz coil assembly a provides a spatial universal rotational magnetic field, and the rotor following unit b provides pitch and yaw rotation with two degrees of freedom under the drive of a coaxial following magnetic torque of the rotational magnetic field; and the operating principle adopts the coaxial following magnetic torque effect of the spatial universal rotational magnetic field.

The composition of the rotor following unit b of the novel electromagnetic drive spherical robotic wrist with two degrees of freedom of the present disclosure is described in accordance with FIGS. 2, 3(A)-3(C) and 3(D)-3(H).

The rotor following unit b comprises an internal cross universal joint d (provided with a rotor permanent magnet cylinder inside, i.e., a permanent magnet cylinder with radial magnetization 1), an external cross universal joint c (provided with a brake mechanism, a damping mechanism, a measuring mechanism and so on) and a fixed end e. The internal cross universal joint d and the external cross universal joint c have the same rotation center, i.e., the wrist rotation center, so that a spherical wrist is formed, decoupling of rotation with two degrees of freedom is realized, and the yaw angle and the pitch angle can be measured and controlled separately; and the internal cross universal joint d and the external cross universal joint c both have a hollow structure in order to increase the internal accommodation space.

The internal cross universal joint d and the external cross universal joint c both use a fixed end support seat 5 as input ends (drive fork) to ensure that the two input ends are coaxial; and the output end 33 (the driven fork) of the external cross universal joint c and the output end, i.e., the connecting rod 32 (the driven fork), of the internal cross universal joint d are also coaxially connected, forming the rotor following unit b of the wrist.

The axis of the rotor following unit b is just a wrist rotation axis and can realize fixed point (the wrist rotation center) pitch and yaw rotation with two degrees of freedom, the permanent magnet cylinder with radial magnetization 1 is installed in the rotor following unit b and can freely rotate with the rotational magnetic field, and the pitch and yaw rotation of the wrist is driven and realized by the coaxial following magnetic torque of the external rotational magnetic field as the dynamic medium.

The external cross universal joint c comprises: two vertical support frames (the drive fork) on outer ends of the fixed end support seat 5, an external universal joint inner ring 3 (cross shaft bracket) and an external universal joint outer ring 17 (the driven fork). The external universal joint inner ring 3 has an integral annular structure with four holes (cross shaft holes) evenly distributed around the circumference; and the external universal joint outer ring 17 is symmetrically composed of two support rods with a semi-annular structure with two coaxial holes evenly distributed in the top.

The posture of the end effector f connected to the output end 33 of the external cross universal joint c is determined by the yaw and pitch angles of the axis of the rotor following unit b. As the input end of the external cross universal joint c, i.e., the fixed end support seat 5, cannot rotate, the posture of the end effector f is consistent with the axis of the rotor following unit b, so the rotation angle of the end effector f does not deflect, which is convenient for adjusting the normal direction of the end effector f to position the wrist. The end effector f can be provided with a force sensor g.

Figure 3A:
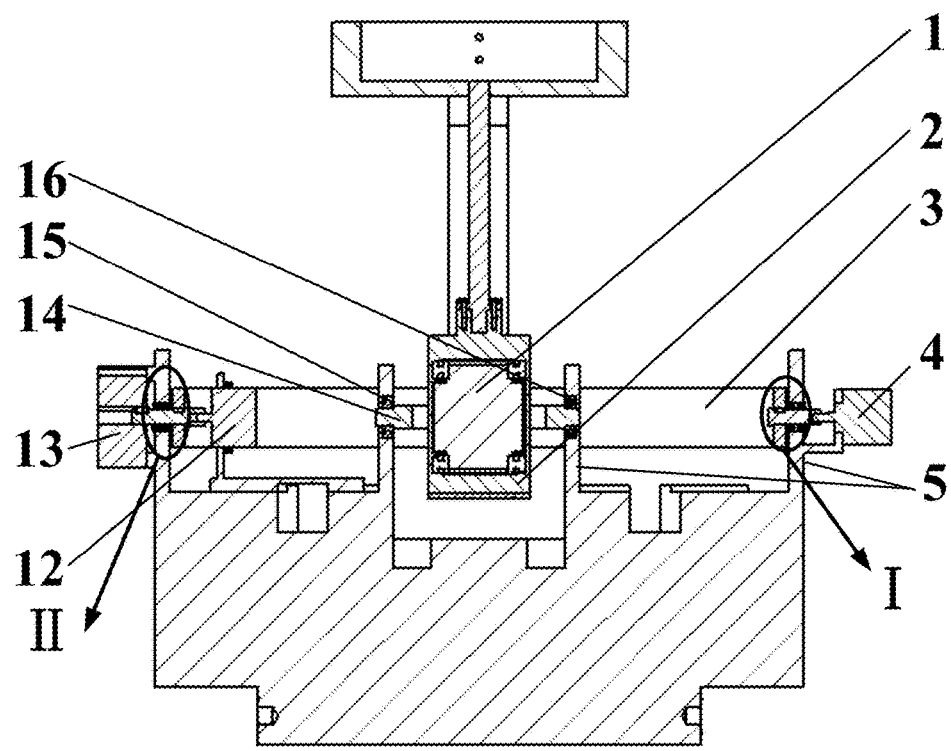
FIG. 3(A) is a sectional schematic diagram of a pitch transmission mechanism of a robotic wrist of the present disclosure.
Figures 3B, 3C:
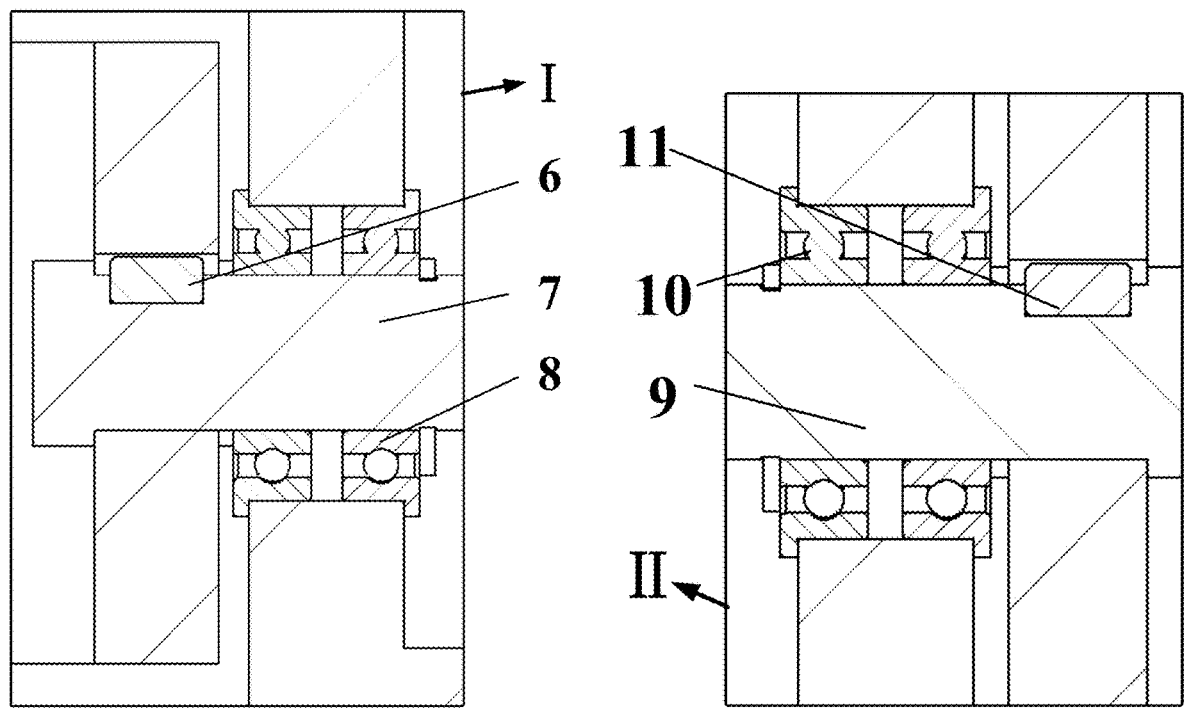
FIG. 3(B) is a partial enlarged view of I in the sectional schematic diagram of a pitch transmission mechanism of a robotic wrist of the present disclosure.
FIG. 3(C) is a partial enlarged view of II in the sectional schematic diagram of a pitch transmission mechanism of a robotic wrist of the present disclosure.
Figure 3D:
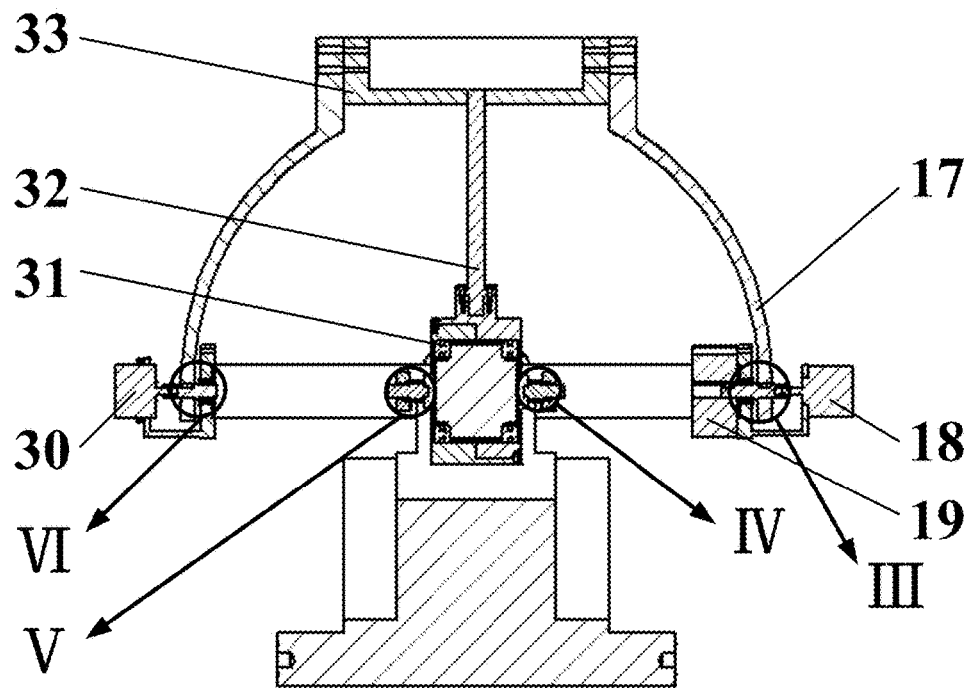
FIG. 3(D) is a sectional schematic diagram of a yaw transmission mechanism of a robotic wrist of the present disclosure.
Figure 3E:
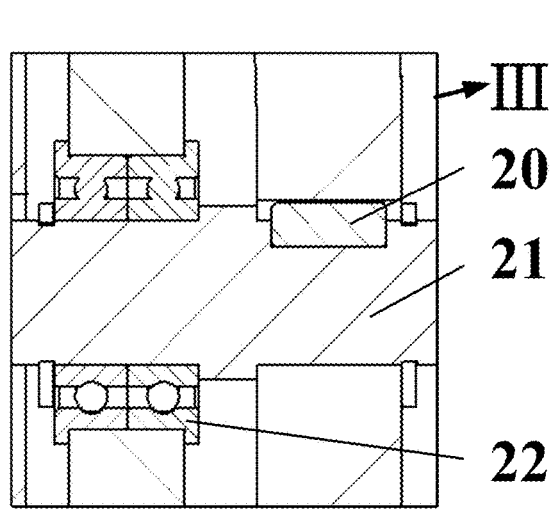
FIG. 3(E) is a partial enlarged view of III in the sectional schematic diagram of a yaw transmission mechanism of a robotic wrist of the present disclosure.
Figure 3F:
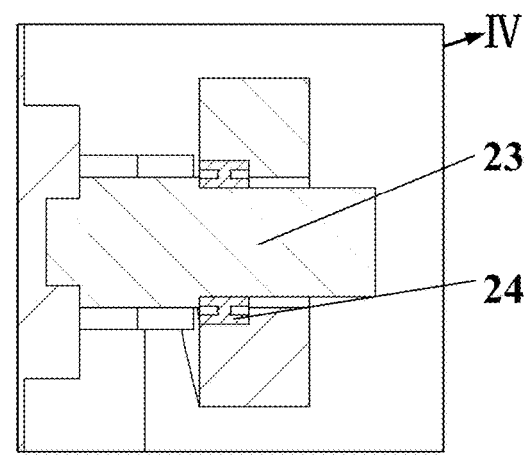
FIG. 3(F) is a partial enlarged view of IV in the sectional schematic diagram of a yaw transmission mechanism of a robotic wrist of the present disclosure.
Figure 3G:
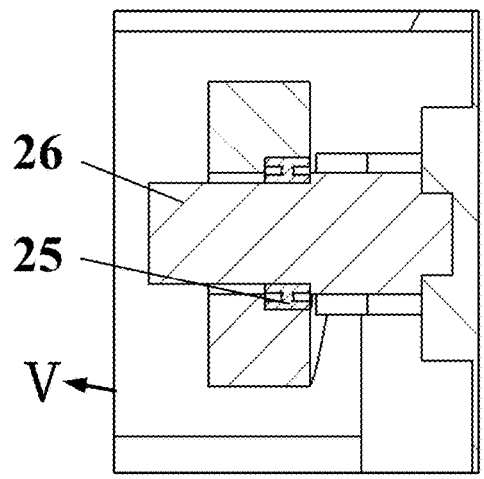
FIG. 3(G) is a partial enlarged view of V in the sectional schematic diagram of a yaw transmission mechanism of a robotic wrist of the present disclosure.
Figure 3H:
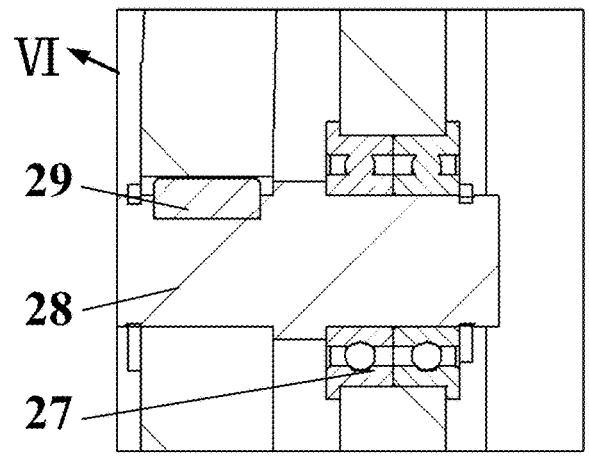
FIG. 3(H) is a partial enlarged view of VI in the sectional schematic diagram of a yaw transmission mechanism of a robotic wrist of the present disclosure.

Referring to FIGS. 3(A)-3(C), the fixed end support seat 5 (equivalent to the drive fork) and the external universal joint inner ring 3 can realize relative rotation, and an assembly process of a pitching rotating shaft is that: the external universal joint inner ring 3 is fixedly connected to a connecting shaft a 7 through a general flat key a 6, and one vertical support frame on an outer end of the fixed end support seat 5 is connected to the connecting shaft a 7 through a flange bearing a 8; the external universal joint inner ring 3 is fixedly connected to a connecting shaft b 9 through a general flat key b 11, and another vertical support frame on an outer end of the fixed end support seat 5 is connected to the connecting shaft b 9 through a flange bearing b 10;

Referring to FIGS. 3(D)-3(H), the external universal joint outer ring 17 (equivalent to the driven fork) and the external universal joint inner ring 3 can realize relative rotation, and an assembly process of a yawing rotating shaft is that: the external universal joint outer ring 17 is fixedly connected to a connecting shaft c 21 through a general flat key c 20, and the external universal joint inner ring 3 is connected to the connecting shaft c 21 through a flange bearing c 22; the external universal joint outer ring 17 is fixedly connected to a connecting shaft f 28 through a general flat key d 29, and the external universal joint inner ring 3 is connected to the connecting shaft f 28 through a flange bearing d 27.

The internal cross universal joint d comprises three parts: the two vertical support frames (the drive fork) in the middle of the fixed end support seat 5, an internal universal joint inner ring 14 (a cross shaft) and a cylindrical case 2 (the driven fork); the internal universal joint inner ring 14 is equivalent to a cross shaft bracket.

Referring to FIGS. 3(A)-3(C), the two vertical support frames in the middle of the fixed end support seat 5 and the internal universal joint inner ring 14 can realize relative rotation, and the assembly process of the pitching rotating shaft is that: the internal universal joint inner ring 14 is connected to the two vertical support frames in the middle of the fixed end support seat 5 through a deep groove ball bearing a 15 and a deep groove ball bearing b 16.

Referring to FIGS. 3(D)-3(H), the cylindrical case 2 and the internal universal joint inner ring 14 can realize relative rotation, and the assembly process of the yawing rotating shaft is that: a connecting shaft d 23 is fixedly connected to the cylindrical case 2 at one end, and is connected to the internal universal joint inner ring 14 through a deep groove ball bearing c 24 at the other end; a connecting shaft e 26 is fixedly connected to the cylindrical case 2 at one end, and is connected to the internal universal joint inner ring 14 through a deep groove ball bearing d 25 at the other end.

The rotor following unit b composed of the external cross universal joint c and the internal cross universal joint d is characterized in that: the internal and external cross universal joints have the same rotation center (i.e., the wrist rotation center), and the input ends (the drive fork) and the output ends (the driven fork) of the external cross universal joint c and the internal cross universal joint d are respectively coaxially and fixedly connected, so that a spherical wrist is formed, decoupling of rotation with two degrees of freedom is realized, and thus yaw angle and pitch angle can be measured and controlled separately, and the external cross universal joint c and the internal cross universal joint d both have a hollow structure in order to increase the internal accommodation space; the input ends (the drive fork) of the external cross universal joint c and the internal cross universal joint d are both the fixed end support seat 5, which is equivalent to that the input ends of the external cross universal joint c and the internal cross universal joint d are coaxially and fixedly connected. The output ends (the driven fork) of the external cross universal joint c and the internal cross universal joint d are coaxially connected, i.e., a coaxial connection process of the external cross universal joint outer ring 17 and the cylindrical case 2 is that: the connecting rod 32 is respectively fixedly connected to the cylindrical case 2 and the output end 33 at both ends, and the output end 33 is fixedly connected to the external cross universal joint outer ring 17. The permanent magnet cylinder with radial magnetization 1 is installed in the cylindrical case 2 through a bearing 31, and the permanent magnet cylinder with radial magnetization 1 can realize coaxial spinning relative to the rotor following unit b.

On the premise that two input ends (the drive fork) of the external cross universal joint c and the internal cross universal joint d are coaxially connected, two output ends (the driven fork) of the external cross universal joint c and the internal cross universal joint d are coaxially connected to form the rotor following unit b of the wrist, the axis of the rotor following unit b is just the wrist rotation axis, which can realize fixed point (the wrist rotation center) pitch and yaw rotation with two degrees of freedom, and the permanent magnet cylinder with radial magnetization 1 realizes fixed point pitch and yaw rotation with two degrees of freedom of the wrist under the drive of the coaxial following magnetic torque of the spatial universal rotational magnetic field.

Wrist posture detection and control methods are as follows:

The rotor following unit b has only one fixed point (the wrist rotation center), and it is also necessary to control the orientation of the rotation axis of the rotor following unit b. Specifically, the orientation of the wrist axis is controlled by detecting and controlling the relative motion of each part of the external cross universal joint c. The external cross universal joint c realizes the universal rotation of the wrist axis through the relative motion of the three parts, i.e., the two vertical support frames on outer ends of the fixed end support seat 5, the external universal joint inner ring 3 and the external universal joint outer ring 17. As the external universal joint inner ring 3 has an integral annular structure with four holes (the cross shaft holes) evenly distributed around the circumference, and the external universal joint outer ring 17 is symmetrically composed of two support rods with a semi-annular structure with two coaxial holes evenly distributed in the top, the connection can be as follows:

One group of two coaxial holes of the external universal joint inner ring 3 (the cross shaft bracket) are connected to the two vertical support frames (the drive fork) on outer ends of the fixed end support seat 5 to form a pitching rotating shaft (one cross shaft), and the external universal joint inner ring 3 can rotate around an axis; an absolute encoder a 4, a brake a 13 and a damper a 12 are respectively installed between the rotating shafts of the external universal joint inner ring 3 and the two vertical support frames on outer ends of the fixed end support seat 5, then the relative angle (i.e., a wrist pitch angle) between the external universal joint inner ring 3 and the two vertical support frames on outer ends of the fixed end support seat 5 can be measured by the encoder a 4; Another group of two coaxial holes of the external universal joint inner ring 3 are coaxially connected with two holes of the two support rods with a semi-annular structure of the external universal joint outer ring 17 to form a yawing rotating shaft (another cross shaft), and the external universal joint outer ring 17 can rotate relative to the external universal joint inner ring 3 around an axis; an absolute encoder b 18, a brake b 19 and a damper b 30 are respectively installed between the rotating shafts of the external universal joint inner ring 3 and the external universal joint outer ring 17, then the relative angle (i.e., a wrist yaw angle) between the external universal joint inner ring 3 and the external universal joint outer ring 17 can be measured by the encoder b 18.

The absolute encoder b 18 and the absolute encoder a 4 installed at the two vertical rotating shafts of the external cross universal joint c can realize real-time measurement of the yaw and pitch angles and transmit the measurement results to a control system, so as to realize accurate control of the yaw and pitch angles.

The brake a 13 and the brake b 19 are both electromagnetic brakes which realizes the locking of the wrist to pitch and yaw in two degrees of freedom; when the wrist is at rest, the brake a 13 and the brake b 19 lock the external cross universal joint c to fix the orientation of the rotor following unit b and prevent accidents caused by random swing; when the wrist rotates, the brake a 13 and the brake b 19 release the locking of the external cross universal joint c to realize the motion of the rotor following unit b following the universal rotational magnetic field, i.e., to realize the drive of pitch and yaw rotation. When only one rotating shaft of the external cross universal joint c is locked, the wrist becomes a wrist rotatable with single degree of freedom; the motions in two degrees of freedom are independent of each other and do not affect each other, so that independent detection and control can be realized, and two single-degree-of-freedom control modes of yaw and pitch of the wrist can be realized.

The damper a 12 and the damper b 30 are installed at the joints of the two cross rotating shafts (pitching and yawing rotating shafts) of the external cross universal joint c and provide damping for pitch and yaw rotation, so as to reduce the oscillation of the wrist during yaw and pitch posture adjustment.

When the wrist completes positioning and grasping motions, the restriction of wrist pitching and yawing can be lifted through the active drive control of the coaxial following magnetic torque of the rotational magnetic field, so as to make the wrist become a compliance passive wrist, effectively remove mechanical interference, meet the special requirements of the robotic wrist in spatial extreme environment, and complete the complex operations such as rotational installation and opening a hatch.

The implementation of pitch rotation detection and control of the novel electromagnetic drive spherical robotic wrist with two degrees of freedom of the present disclosure is described in accordance with FIGS. 3(A)-3(C).

An implementation process of pitch rotation measurement is that: the external universal joint inner ring 3 is fixedly connected to the connecting shaft a 7 through the general flat key a 6, and the fixed end support seat 5 (the drive fork of the external cross universal joint c) is connected to the connecting shaft a 7 through the flange bearing a 8, so that relative rotation between the external universal joint inner ring 3 and the fixed end support seat 5 is realized; and the encoder a 4 is fixedly connected to the fixed end support seat 5 and is connected to the connecting shaft a 7 to realize pitch angle measurement.

An implementation process of pitch rotation control is that: the external universal joint inner ring 3 is fixedly connected to the connecting shaft b 9 through the general flat key b 11, and the fixed end support seat 5 is connected to the connecting shaft b 9 through the flange bearing b 10, so that relative rotation between the external universal joint inner ring 3 and the fixed end support seat 5 is realized; the damper a 12 is fixedly connected to the fixed end support seat 5 and is connected to the connecting shaft b 9 to realize changing of pitch angle damping characteristics, so as to reduce oscillation phenomenon; and the brake a 13 is fixedly connected to the fixed end support seat 5 and is connected to the connecting shaft b 9 to realize pitch angle locking. This part of structure realizes the functions of braking, measuring and changing damping characteristics of pitch rotation.

The implementation of yaw rotation detection and control of the novel electromagnetic drive spherical robotic wrist with two degrees of freedom of the present disclosure is described in accordance with FIGS. 3(D)-3(H).

An implementation process of yaw rotation measurement is that: the external universal joint outer ring 17 is fixedly connected to the connecting shaft c 21 through the general flat key c 20, and the external universal joint inner ring 3 is connected to the connecting shaft c 21 through the flange bearing c 22, so that relative rotation between the external universal joint outer ring 17 and the external universal joint inner ring 3 is realized; and the encoder b 18 is fixedly connected to the external universal joint inner ring 3 and is connected to the connecting shaft c 21 to realize yaw angle measurement.

An implementation process of yaw rotation control is that: the external universal joint outer ring 17 is fixedly connected to the connecting shaft f 28 through the general flat key d 29, and the external universal joint inner ring 3 is connected to the connecting shaft f 28 through the flange bearing d 27, so that relative rotation between the external universal joint outer ring 17 and the external universal joint inner ring 3 is realized; the damper b 30 is fixedly connected to the external universal joint inner ring 3 and is connected to the connecting shaft f 28 to realize changing of pitch angle damping characteristics, so as to reduce oscillation phenomenon; and the brake b 19 is fixedly connected to the external universal joint inner ring 3 and is connected to the connecting shaft c 21 to realize yaw angle locking. This part of structure realizes the functions of braking, measuring and changing damping characteristics of yaw rotation.

The operating principle of the novel electromagnetic drive spherical robotic wrist with two degrees of freedom of the present disclosure is described in accordance with FIGS. 4(A), 4(B), 4(C) and 4(D).

Figure 4A:
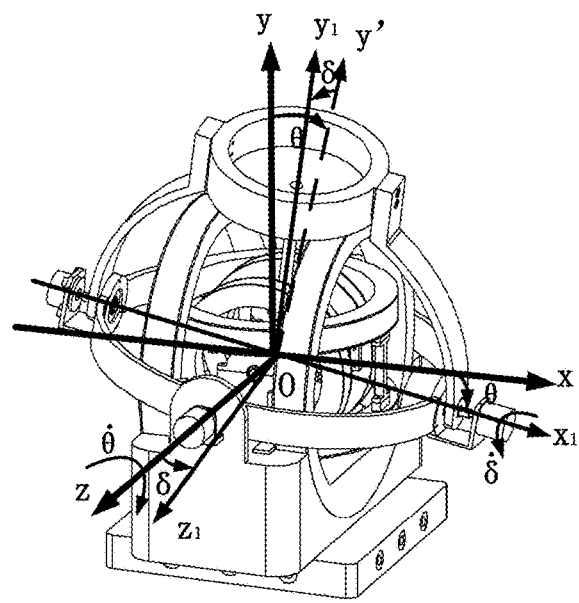
FIG. 4(A) is a schematic diagram of a process of converting the axis of a robotic wrist of the present disclosure from a fixed coordinate system to the Résal coordinate system.

First, the reasons why the pitch angle and yaw angle of the axis of the robotic wrist of the present disclosure can be independently measured are explained in accordance with FIG. 4(A). A coordinate system is established in FIG. 4(A) as follows: a fix coordinate system Oxyz is fixedly connected with the three axis Helmholtz coil assembly a, and the initial position of the wrist axis is vertical upward, wherein an Oz axis is coincident with the pitch rotation axis of the encoder a 4 connected to the external cross universal joint c, and an Ox axis is coincident with the yaw rotation axis of the encoder b 18 connected to the external cross universal joint c.

A Résal coordinate system $Ox_1y_1z_1$ is obtained by rotating the fixed coordinate system Oxyz twice. First, the fixed coordinate system $O_{xyz}$ is rotated around the Oz axis by a pitch angle θ to obtain an intermediate coordinate system $Ox_1y'z$, so that the pitch angle θ can be measured by the encoder a 4 connected to the external cross universal joint c, and an $Ox_1$ axis is always coincident with the yaw rotation axis of the encoder b 18 connected to the external cross universal joint c; then, the intermediate coordinate system $Ox_1y'z$ is rotated around the $Ox_1$ axis by a yaw angle δ to obtain the Résal coordinate system $Ox_1y_1z_1$, so that the yaw angle δ can be measured by the encoder b 18 connected to the external cross universal joint c, and $Oy_1$ is the new orientation of the wrist axis after two rotations. It can be seen that, through the two rotations from the fixed coordinate system Oxyz to the Résal coordinate system $Ox_1y_1z_1$, and in combination with the structural decoupling characteristics of the mutually perpendicular pitching rotating shaft and yawing rotating shaft caused on the external cross universal joint c, the pitch angle θ and the yaw angle δ of the spatial orientation of the wrist axis can be respectively directly measured by the encoder a 4 and the encoder b 18 connected to the external cross universal joint c.

The drive principle of coaxial following magnetic torque effect of the robotic wrist of the present disclosure is proved and a formula of the coaxial following magnetic torque is derived below in accordance with FIGS. 4(B), 4(C) and 4(D).

Figure 4B:
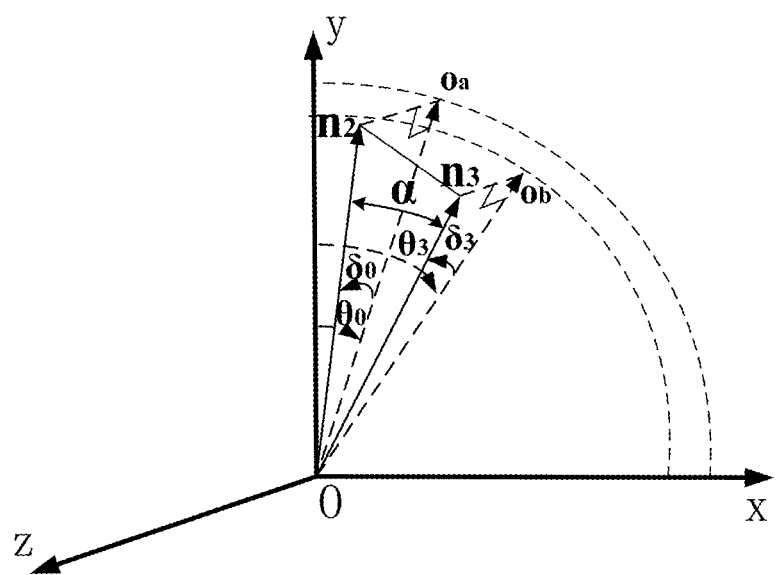
FIG. 4(B) is a schematic diagram of spatial positions of an axis vector and a rotation axis vector of a spatial universal rotational magnetic field of a robotic wrist of the present disclosure.

The spatial orientations of the wrist axis and the rotation axis of the spatial universal rotational magnetic field in the fixed coordinate system Oxyz are described by the pitch angle θ and the yaw angle δ used in the transformation process of the Résal coordinate system $Ox_1y_1z_1$ in FIG. 4(A), a motor structure is omitted, and arbitrary spatial positions of an axis direction vector $n_2$ ($θ_0$, $δ_0$) of the permanent magnet cylinder with radial magnetization 1 (a wrist axis vector) and a rotation axis vector $n_3$ ($θ_3$, $δ_3$) of the spatial universal rotational magnetic field in the fixed coordinate system in FIG. 4(B) can be obtained, wherein $O_a$ and $O_b$ are respectively projections of end points of the vector $n_2$ and the vector $n_3$ on a plane Oxy. The spatial included angle between the vector $n_2$ and the vector $n_3$ is α.

Figure 4C:
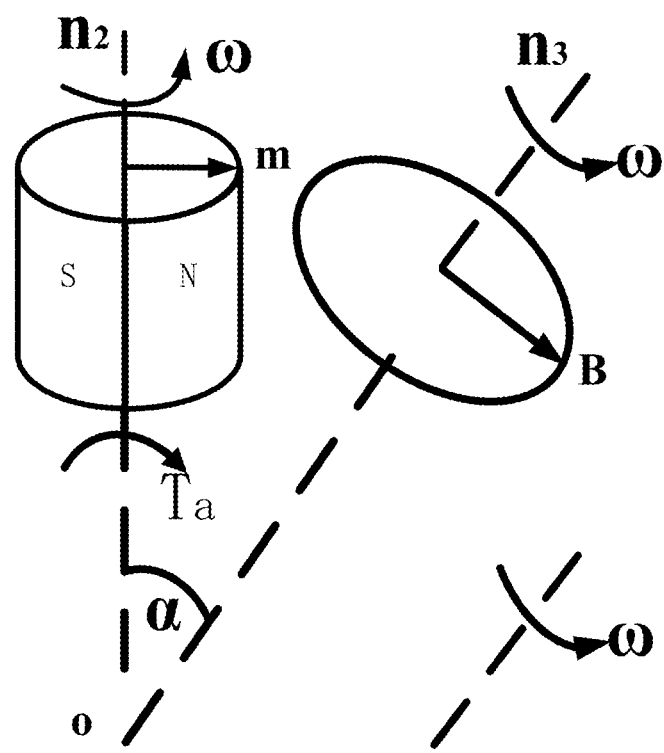
FIG. 4(C) is a schematic diagram of a drive model of the coaxial following magnetic torque effect of a robotic wrist of the present disclosure.

FIG. 4(C) is a drive model diagram of coaxial following magnetic torque effect of the wrist. As can be obtained by intercepting the plane formed by the vector $n_2$ and the vector $n_3$ in FIG. 4(B), a drive model shows a relative motion relationship of the permanent magnet cylinder with radial magnetization 1 (the rotation axis is $n_2$) with a magnetic dipole moment of m rotating simultaneously in a rotational magnetic field B (the rotation axis is $n_3$) at an angular velocity ω, wherein the rotation axis vector $n_3$ ($θ_3$, $δ_3$) of the spatial universal rotational magnetic field generated by the three axis Helmholtz coil assembly a is fixed, and the pitch angle $θ_0$ and the yaw angle $δ_0$ are respectively locked by the brake a 13 and the brake b 19 on the external cross universal joint c, so that the axis direction vector $n_2$ ($θ_0$, $δ_0$) of the permanent magnet cylinder with radial magnetization 1 is also fixed, the permanent magnet cylinder with radial magnetization 1 can only spin with the spatial universal rotational magnetic field at the velocity ω, and Ta is the coaxial following magnetic torque generated by the spatial universal rotational magnetic field spinning at the velocity ω on the permanent magnet cylinder with radial magnetization 1 rotating at the velocity ω. It is proved below that the action direction of the coaxial following magnetic torque makes the rotation plane of a magnetic dipole moment vector m of the magnet cylinder flipped to the rotation plane of a magnetic vector B, i.e., the coaxial following magnetic torque makes the rotation axis $n_2$ of the permanent magnet cylinder with radial magnetization 1 with the magnetic dipole moment m rotate to the direction of the rotation axis vector $n_3$ of the magnetic vector B until coinciding.

Figure 4D:
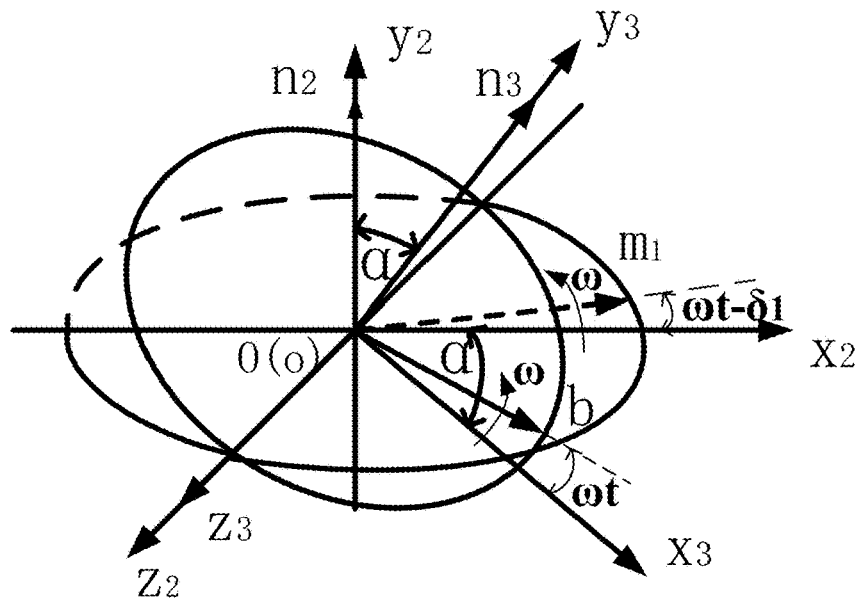
FIG. 4(D) is a schematic diagram of establishing a coordinate system for calculating the coaxial following magnetic torque of a robotic wrist of the present disclosure.

FIG. 4(D) is a schematic diagram of establishing a coordinate system for calculating the coaxial following magnetic torque of the robotic wrist of the present disclosure. A fixed coordinate system $Ox_3y_3z_3$ where the rotational magnetic field is located and a fixed coordinate system $Ox_2y_2z_2$ where a magnetic dipole moment rotation vector m is located are established as follows: the vectors $n_2$ and $n_3$ are respectively taken as $Oy_2$ and $Oy_3$ axes, the intersecting line of the rotation plane of the magnetic field and the rotation plane of the magnetic dipole moment vector m is respectively taken as $Oz_2$ and $Oz_3$ axes, and O is the origin of the two fixed coordinate systems.

The coordinate system $Ox_3y_3z_3$ where the rotational magnetic field is located is obtained by rotating the coordinate system $Ox_2y_2z_2$ where the magnetic dipole moment vector m is located around the $Oz_2$ axis by an angle $-\alpha$, then a transformation matrix between the coordinate system $Ox_3y_3z_3$ where the rotational magnetic field is located and the coordinate system $Ox_2y_2z_2$ where the magnetic dipole moment rotation vector m is located is:

$$A = \begin{pmatrix} \cos\alpha & \sin\alpha & 0 \\ -\sin\alpha & \cos\alpha & 0 \\ 0 & 0 & 1 \end{pmatrix}$$

ob is a unit rotation magnetic vector in the coordinate system $Ox_3y_3z_3$ with a coordinate of $(\cos(\omega t), 0, -\sin(\omega t))$, $om_1$ a unit rotation magnetic vector in the coordinate system $Ox_2y_2z_2$ with a coordinate of $(\cos(\omega t-\delta_1), 0, -\sin(\omega t-\delta_1))$, and $\delta_1$ the slip angle of the magnetic dipole moment rotation vector m relative to the rotational magnetic field B.

It can be obtained that the coordinate of ob in the coordinate system $OX_2Y_2Z_2$ is:

$$ob = \begin{pmatrix} \cos\alpha & \sin\alpha & 0 \\ -\sin\alpha & \cos\alpha & 0 \\ 0 & 0 & 1 \end{pmatrix} \begin{pmatrix} \cos\omega t \\ 0 \\ -\sin\omega t \end{pmatrix} = \begin{pmatrix} \cos\alpha\cos\omega t \\ -\cos\omega t\sin\alpha \\ -\sin\omega t \end{pmatrix}$$

According to a vector cross product formula:

$$T_2 = m \times B = m_0 B_0 \begin{pmatrix} \cos(\omega t - \delta_1) \\ 0 \\ -\sin(\omega t - \delta_1) \end{pmatrix} \times \begin{pmatrix} \cos\alpha\cos\omega t \\ -\sin\alpha\cos\omega t \\ -\sin\omega t \end{pmatrix} = m_0 B_0 \begin{pmatrix} y_2 z_3 - y_3 z_2 \\ z_2 x_3 - z_3 x_2 \\ x_2 y_3 - x_3 y_2 \end{pmatrix} =$$

$$m_0 B_0 \begin{pmatrix} -\sin\alpha\cos\omega t \sin(\omega t - \delta_1) \\ \cos(\omega t - \delta_1)\sin\omega t - \cos\alpha\cos\omega t\sin(\omega t - \delta_1) \\ -\sin\alpha\cos\omega t\cos(\omega t - \delta_1) \end{pmatrix}$$

The slip angle is usually very small, and when $\delta_1=0$:

$$T_{x2} = -m_0 B_0 \sin\alpha\cos\omega t\sin\omega t = -\frac{1}{2}m_0 B_0 \sin\alpha\sin 2\omega t$$

$$T_{y2} = m_0 B_0 (1-\cos\alpha)\cos\omega t\sin\omega t = m_0 B_0 \frac{(1-\cos\alpha)}{2}\sin 2\omega t$$

$$T_{z2} = -m_0 B_0 \sin\alpha\cos^2\omega t = -m_0 B_0 \frac{1+\cos 2\omega t}{2}\sin\alpha$$

Wherein $m_0$ and $B_0$ are amplitudes of the magnetic torque vector and the magnetic vector. From the above formula, it can be concluded that $T_{x2}$, $T_{y2}$ and $T_{z2}$ are periodic functions, and the periods are respectively:

$$t_{x2} = t_{y2} = t_{z2} = \frac{\pi}{\omega}$$

As $\alpha$ is a definite value, the average torque in a single period is:

$$T_{x2average} = \frac{-\frac{1}{2}m_0 B_0 \sin\alpha \int_{-\frac{\pi}{2\omega}}^{\frac{\pi}{2\omega}} \sin 2\omega t\, d2\omega t}{2\pi} = 0 \quad (2)$$

$$T_{y2average} = \frac{\frac{m_0 B_0 (1-\cos\alpha)}{2} \int_{-\frac{\pi}{2\omega}}^{\frac{\pi}{2\omega}} \sin 2\omega t\, d2\omega t}{2\pi} = 0$$

$$T_{z2average} = \frac{-_0 B_0 \sin\alpha \int_{-\frac{\pi}{2\omega}}^{\frac{\pi}{2\omega}} \frac{1+\cos 2\omega t}{2} d2\omega t}{2\pi} = -\frac{m_0 B_0 \sin\alpha}{2}$$

It can be known from formula (2) that the coaxial following magnetic torque is only along the $Oz_2$ axis, and the magnetic torques along $Ox_2$ and $Oy_2$ are 0, i.e., the coaxial following magnetic torque only acts on the rotation plane formed by the rotation axis $n_2$ of the magnetic dipole moment vector m of the magnet cylinder and the rotation axis $n_3$ of the magnetic vector B, and the rotation plane of the magnetic dipole moment vector m of the magnet cylinder is flipped to the rotation plane of the magnetic vector B. Therefore, a calculation formula of the coaxial following magnetic torque can be simplified as:

$$T_a = -\frac{m_0 B_0 \sin\alpha}{2} \quad (3)$$

Wherein angle $\alpha$ is the included angle between the axis of the permanent magnet cylinder with the magnetic dipole moment of m and the rotation axis of the rotational magnetic field B, and $m_0$ and $B_0$ are the amplitudes of the magnetic torque vector and a rotational magnetic vector.

When a wrist driving magnetic torque vector is provided by the permanent magnet cylinder with radial magnetization 1, it is equivalent to that the permanent magnet is only under the action of the magnetic torque along the negative direction of the $Oz_2$ axis in each period. Under the action of this magnetic torque, the rotation plane of the magnetic dipole moment vector m of the magnet cylinder is flipped to the rotation plane of the magnetic vector B, i.e., the axis of the permanent magnet is close to the axis of the rotational magnetic field, and the magnetic torque vector is the coaxial following magnetic torque of permanent magnet cylinder. This phenomenon is called the coaxial following magnetic torque effect of the rotational magnetic field. The coaxial following magnetic torque effect of the spatial universal rotational magnetic field can guide the axis of the permanent magnet to any spatial orientation. If the locking of the pitch angle $\theta_0$ and the yaw angle $\delta_0$ are released respectively by the brake a 13 and the brake b 19 on the external cross universal joint c, the axis direction vector $n_2$ ($\theta_0$, $\delta_0$) of the permanent magnet cylinder with radial magnetization 1 can not only spin with the spatial universal rotational magnetic field at the velocity $\omega$, but also drive the rotor following unit b to rotate to the rotation axis vector $n_3$ ($\theta_3$, $\delta_3$) of the spatial universal rotational magnetic field. The coaxial following magnetic torque can certainly be used for the electromagnetic drive of a spherical joint, and this is the theoretical basis of the electromagnetic drive of the spherical joint.

Figure 5:
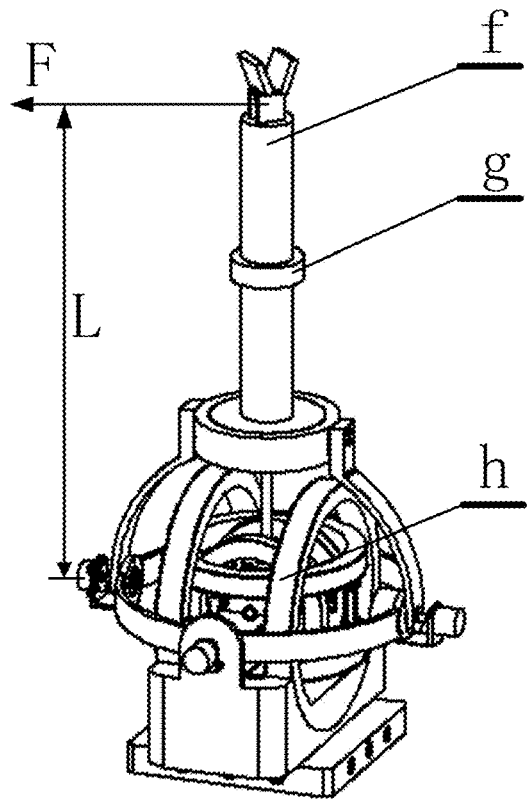
FIG. 5 is a schematic diagram of the control principle of active and passive modes of a robotic wrist of the present disclosure.

A specific embodiment on how to realize coaxial following magnetic torque control of the novel electromagnetic drive spherical robotic wrist with two degrees of freedom is described below in accordance with FIG. 4(C) and FIG. 5.

First, it is assumed that in a plane formed by an acting force vector F at the end of an end effector f and the axis of the end effector f, the direction of a torque generated by F on the wrist rotation center is inevitably opposite to the direction of the coaxial following magnetic torque, at this point, the electromagnetic drive spherical robotic wrist with two degrees of freedom is a direct electromagnetic drive spherical active joint, the principle of electromagnetic drive is the coaxial following magnetic torque effect of the rotational magnetic field. As the coaxial following magnetic torque only acts on the rotation plane formed by the rotation axis $n_2$ of the magnetic dipole moment vector m of the magnet cylinder and the rotation axis $n_3$ of the magnetic vector B, and the rotation plane of the magnetic dipole moment vector m of the magnet cylinder is flipped to the rotation plane of the magnetic vector B, apparently, the acting force vector F at the end of the end effector f is also in the rotation plane formed by the rotation axis $n_2$ and the rotation axis $n_3$, and formula (3) is the calculation formula of the coaxial following magnetic torque. Formula (3) shows that the coaxial following magnetic torque of the wrist can be controlled by the amplitude $I_0$ of a sinusoidal current in the three orthogonal (square) Helmholtz coil assemblies or by the included angle $\alpha$, and can also be controlled by both to increase the magnetic torque.

That is to say, when F is relatively large, the included angle $\alpha$ changes greatly; as the torque adjustment range is relatively large, the coaxial following magnetic torque of the permanent magnet can be controlled simultaneously by the amplitude $I_0$ of the sinusoidal current in the three orthogonal (square) Helmholtz coil assemblies and the included angle $\alpha$ between the axis of the permanent magnet cylinder and the axis of the rotational magnetic field, so as to increase the torque adjustment range and make the wrist become a compliance wrist. As no friction force of a complex mechanical transmission system is generated, torque control can be realized quickly by direct electromagnetic drive.

A specific embodiment on how to realize variable stiffness control of the novel electromagnetic drive spherical robotic wrist with two degrees of freedom is described below in accordance with FIG. 4(C) and FIG. 5.

First, a stiffness calculation formula of a joint driven by the coaxial following magnetic torque is derived mathematically. It is assumed that in the plane formed by the acting force vector F at the end of the end effector f and the axis of the end effector f in FIG. 5, the direction of the torque generated by F on the wrist rotation center is inevitably opposite to the direction of the coaxial following magnetic torque, then the stiffness of electromagnetic drive spherical joint is:

$$k = \frac{F}{s} \quad (4)$$

Wherein s is the deformation at the end of the end effector f along the direction of the acting force, L is the distance from the acting force F at the end of the end effector to the center of an electromagnetic drive spherical robotic joint, then $s=L\alpha$, and $\alpha$ is the included angle between the axis of the permanent magnet cylinder with radial magnetization 1 with the magnetic dipole moment of m and the axis of the rotational magnetic field B. It is assumed that the initial value of $\alpha$ is zero, as shown in FIG. 4(C).

The torque generated by the acting force F at the end of the end effector f shall be equal to the coaxial following magnetic torque of the rotational magnetic field, i.e.:

$$FL = \tfrac{1}{2} m_0 B_0 \sin \alpha \quad (5)$$

(5) is substituted into (4) to obtain:

$$k = \frac{m_0 B_0}{2L} \cdot \frac{\sin\alpha}{\alpha}$$

At this point, as the included angle $\alpha$ is very small, $$\frac{\sin\alpha}{\alpha} \approx 1,$$

and then:

$$k = \frac{m_0 B_0}{2L} \quad (6)$$

Formula (6) shows that the stiffness of the novel electromagnetic drive spherical robotic joint can be linearly controlled by the amplitude $B_0$ of the rotational magnetic vector, i.e., controlled by the amplitude $I_0$ of the sinusoidal current in the three orthogonal (square) Helmholtz coil assemblies. As no friction force of a complex mechanical transmission system is generated, and a complex variable stiffness mechanical adjustment mechanism is avoided, variable stiffness control of the joint can be realized quickly and conveniently by direct electromagnetic drive, and the control accuracy is significantly improved. Apparently, formula (6) holds only when the included angle $\alpha$ changes very little. That is to say, when F is relatively small, the included angle $\alpha$ changes very little, and the stiffness of the wrist can be directly controlled according to formula (6); at this point, the stiffness can be controlled only by the amplitude $I_0$ of the sinusoidal current, so as to make the wrist become a compliance wrist.

Figure 2:
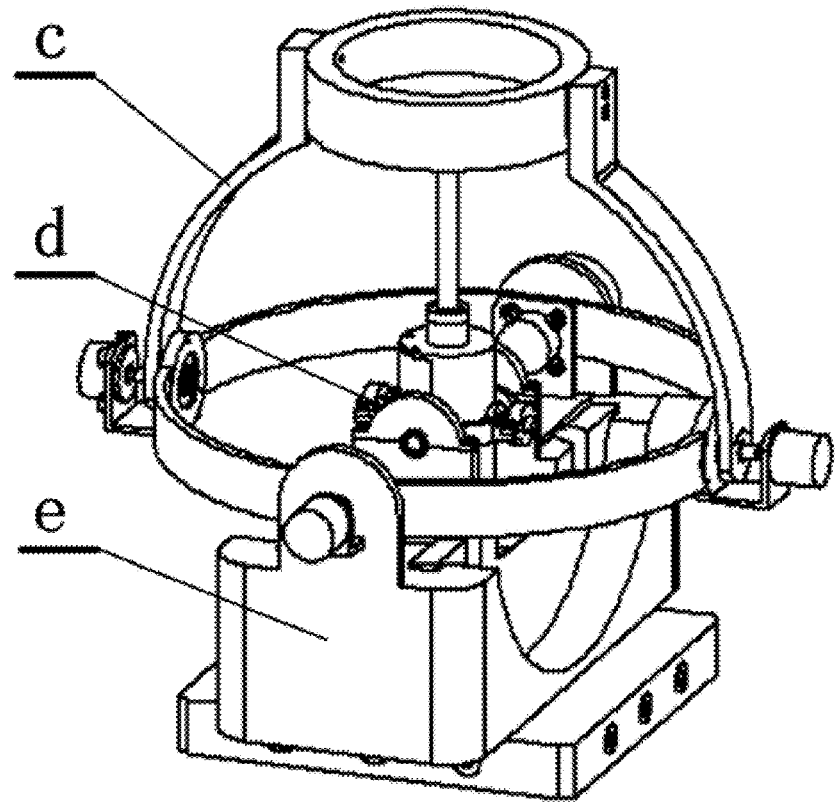
FIG. 2 is a schematic diagram of a rotor following unit of a robotic wrist of the present disclosure.

An operating process of the novel electromagnetic drive spherical robotic wrist with two degrees of freedom is described in accordance with FIGS. 1 and 2.

A posture zero point calibration process before operation of the novel electromagnetic drive wrist is that: the spatial universal rotational magnetic field perpendicular to a rotation axis is generated by the three axis Helmholtz coil assembly a, the rotor following unit b is coincident with the axis of the fixed end e under the drive of the coaxial following magnetic torque, at this point, relative angle of the encoder a 4 with the pitch angle and the encoder b 18 with the yaw angle is zero, and also at this point, the encoder a 4 and the encoder b 18 are respectively energized, so that the zero point position of decoupling with two degrees of freedom of the wrist is stored and memorized; when the wrist with two degrees of freedom is positioned, the pitch and yaw rotation is driven to make the wrist with two degrees of freedom in an active wrist mode, close loop control of an angle position is formed by a control system of the coaxial following magnetic torque according to formula (3), the encoder a 4 and the encoder b 18, and the control accuracy is improved by real-time perception and memory of the pitch and yaw positions of the wrist with two degrees of freedom.

An operation process with two degrees of freedom in active mode of the novel electromagnetic drive wrist is that:

Step 1: before energizing, always locking the external cross universal joint c by the brake a 13 and the brake b 19, so that pitch and yaw rotation cannot be carried out.

Step 2: determining the direction of the rotation axis of the spatial universal rotational magnetic field which shall be exerted according to a target spatial orientation, and supplying three alternating currents with equal frequencies to the three axis Helmholtz coil assembly a according to formula (1) to generate a spatial rotational magnetic field of the corresponding orientation.

Step 3: the permanent magnet cylinder with radial magnetization 1 beginning to spin under the action of the rotational magnetic field and generate the coaxial following magnetic torque according to formula (3); however, because the external cross universal joint c is locked in two degrees of freedom by the brake a 13 and the brake b 19, the rotor following unit b cannot carry out pitch and yaw rotation.

Step 4: energizing the brake a 13 and the brake b 19 to release the locking of the external cross universal joint c; as the permanent magnet cylinder with radial magnetization 1 is under the action of the coaxial following magnetic torque of the rotational magnetic field, the axis of the rotor following unit b follows the axis of the rotational magnetic field to carry out pitch and yaw rotation, the pitch angle is measured by the encoder a 4, the yaw angle is measured by the encoder b 18, and damping is provided by the damper a 12 and the damper b 30 during rotation to prevent oscillation.

Step 5: feeding back pitch and yaw angle information in real time by the encoder a 4 and the encoder b 18; carrying out feedback control of the coaxial following magnetic torque according to the angle information fed back and in accordance with formula (3) until accuracy is satisfied, in order to make the wrist reach a target position and realize the control of motion with two degrees of freedom.

Step 6: de-energizing the three axis Helmholtz coil assembly a, de-energizing the brake a 13 and the brake b 19, and locking the external cross universal joint c again to fix the orientation of the robotic wrist.

When only one rotating shaft of the external cross universal joint c is locked, the wrist becomes a wrist rotatable with single degree of freedom; the motions in two degrees of freedom are independent of each other and do not affect each other, so that independent detection and control can be realized, and two single-degree-of-freedom control modes of yaw and pitch of the wrist can be realized. The single-degree-of-freedom modes have good stability and fewer control variables, and is used for accurate position control. The other steps are the same, and the above step 4 and step 5 respectively follows the following control to realize the single-degree-of-freedom control modes.

An operation process with single degree of freedom in active mode of the novel electromagnetic drive wrist is that:

Step 4: only energizing the brake a 13 to release the uniaxial locking of the external cross universal joint c; as the permanent magnet cylinder with radial magnetization 1 is under the action of the coaxial following magnetic torque of the rotational magnetic field, the axis of the rotor following unit b follows the axis of the rotational magnetic field to carry out yaw rotation, and the yaw angle is measured by the encoder b 18; or only energizing the brake b 19 to release the uniaxial locking of the external cross universal joint c; as the permanent magnet cylinder with radial magnetization 1 is under the action of the coaxial following magnetic torque of the rotational magnetic field, the axis of the rotor following unit b follows the axis of the rotational magnetic field to carry out pitch rotation, and the pitch angle is measured by the encoder a 4.

Step 5: feeding back pitch or yaw angle information in real time by the encoder a 4 or the encoder b 18; carrying out feedback control of the coaxial following magnetic torque according to the angle information fed back and in accordance with formula (3) until accuracy is satisfied, in order to make the wrist reach a target position and respectively realize the control of motion with single degree of freedom.

A specific embodiment on realizing variable stiffness and compliance control of the novel electromagnetic drive spherical robotic wrist with two degrees of freedom is described below in accordance with FIG. 5.

The rotor following unit b of the robotic wrist with two degrees of freedom h has the function of yaw and pitch drive, and can realize the pitch swing of the end effector f of the wrist in any plane of the axis of the fixed end e. Considering that when a hatch is opened, the interference between the track of the end effector f of the wrist and the motion track of the hatch shall be avoided, a force sensor g is installed on the end effector f of the robotic wrist, and close loop control is formed by the control system of the coaxial following magnetic torque and the force F detected by the force sensor g. The included angle α changes according to the force F, i.e., when F is very large, the included angle α changes greatly, and is control by a coaxial following electromagnetic drive torque according to formula (3), i.e., the amplitude $I_0$ of the sinusoidal current on the output end of the wrist is directly reduced along the direction of force in the plane of the detected force, and the included angle α is changed and reduced by the direction of the spatial universal rotational magnetic field, so as to ensure that the motion track of the end effector f of the wrist swings along the direction of force F in the plane formed by the axis of the end effector f and the force F; when F is very small, the included angle α changes very little, then the amplitude $I_0$ of the sinusoidal current can be directly reduced according to formula (6), and the stiffness of the robotic wrist with two degrees of freedom h can be controlled and reduced, so as to realize the motion of the end effector f of the wrist along the direction of the force F in the plane of the force F; the control system of the coaxial following magnetic torque is under close loop control together with the force F detected by the force sensor g and swings along the direction of the force F; when the force F detected by the force sensor g is less than 0.1 N, a full compliance passive wrist can be realized, so as to increase the flexibility of the wrist and protect the wrist from being damaged when opening the hatch. Similarly, when the direction of the force F is changed but F is very large, the included angle α changes greatly, the coaxial following magnetic torque is controlled according to formula (3) to change direction and amplitude, i.e., the amplitude $I_0$ of the sinusoidal current is directly reduced, and the included angle α is changed and reduced along the direction of the force in the plane of the detected force on the output end of the wrist; when F is very small, the included angle α changes very little, the formula (6) holds, and the amplitude $I_0$ of the sinusoidal current is directly reduced according to formula (6), so as to realize variable stiffness control and protect the wrist. When the robotic wrist with two degrees of freedom h operates in a passive wrist mode, the pitch and yaw positions can still be stored and memorized by the absolute encoder a 4 and the absolute encoder b 18; when the robotic wrist with two degrees of freedom h completes an operation and restores to the active wrist mode, the wrist can restore to a zero point calibration position.

The restriction of wrist pitching and yawing can be lifted through the variable stiffness control of the robotic wrist with two degrees of freedom h, so as to make the wrist become a passive wrist. When electromagnetic torque drive is stopped, the wrist becomes a compliant rope, so as to realize full compliance, effectively remove mechanical interference, meet the special requirements of the robotic wrist in spatial extreme environment, and complete the complex operations such as pulling out a rock and opening a spacecraft hatch during sampling on an exoplanet.

The invention claimed is:

1. An electromagnetic drive spherical robotic wrist with two degrees of freedom, comprising a three axis Helmholtz coil assembly (a) and a rotor following unit (b), wherein the three axis Helmholtz coil assembly (a) provides a spatial universal rotational magnetic field, and the rotor following unit (b) provides pitch and yaw rotation with two degrees of freedom under the drive of a coaxial following magnetic torque of the rotational magnetic field;

the rotor following unit (b) comprises an internal cross universal joint (d), an external cross universal joint (c) and a fixed end (e); the fixed end (e) is provided with a fixed end support seat (5) at the top, the fixed end support seat (5) is divided into four vertical support frames on the same axis, the support frames are provided with horizontal holes, the two vertical support frames in the middle are used for installing the internal cross universal joint (d), and the two vertical support frames on outer ends are used for installing the external cross universal joint (c);

the internal cross universal joint (d) comprises the two vertical support frames in the middle of the fixed end support seat (5), an internal universal joint inner ring (14) and a cylindrical case (2), wherein the internal universal joint inner ring (14) is used as a cross shaft bracket, and the cylindrical case (2) is used as a driven fork; both sides of the internal universal joint inner ring (14) are respectively installed in the holes of the two vertical support frames in the middle of the fixed end support seat (5) by a deep groove ball bearing a (15) and a deep groove ball bearing b (16), and the fixed end support seat (5) and the internal universal joint inner ring (14) realize relative rotation, forming a pitching rotating shaft; the cylindrical case (2) is located in the internal universal joint inner ring (14), a connecting shaft d (23) and a connecting shaft e (26) are respectively symmetrically fixed on both sides of the cylindrical case (2) at one end, and are respectively installed on the inner side of the internal universal joint inner ring (14) through a deep groove ball bearing c (24) and a deep groove ball bearing d (25) at the other end, and the cylindrical case (2) and the internal universal joint inner ring (14) realize relative rotation, forming a yawing rotating shaft; a permanent magnet cylinder with radial magnetization (1) is installed in the cylindrical case (2) through a bearing (31);

the external cross universal joint (c) comprises the two vertical support frames on outer ends of the fixed end support seat (5), an external universal joint inner ring (3) and an external universal joint outer ring (17), wherein the external universal joint inner ring (3) is used as a cross shaft bracket, the external universal joint inner ring (3) is symmetrically provided with four coaxial horizontal holes, and the external universal joint outer ring (17) is used as a driven fork; a connecting shaft a (7) and a connecting shaft b (9) are respectively installed in the holes of the two vertical support frames on outer ends of the fixed end support seat (5) by a flange bearing a (8) and a flange bearing b (10); the coaxial holes on two sides of the external universal joint inner ring (3) are respectively fixedly connected to the connecting shaft a (7) and the connecting shaft b (9) through a general flat key a (6) and a general flat key b (11), and the fixed end support seat (5) and the external universal joint inner ring (3) realize relative rotation, forming a pitching rotating shaft; the connecting shaft a (7) is connected to an encoder a (4) at the outer end, the connecting shaft b (9) is connected to a damper a (12) at one end and is connected to a brake a (13) at the other end, and the encoder a (4), the damper a (12) and the brake a (13) are all fixed on the fixed end support seat (5); a connecting shaft c (21) and a connecting shaft f (28) are respectively installed in the coaxial holes on the other two sides of the external universal joint inner ring (3) through a flange bearing c (22) and a flange bearing d (27); the external universal joint outer ring (17) is symmetrically composed of two support rods with a semi-annular structure, the two support rods are respectively fixedly connected to the connecting shaft c (21) and the connecting shaft f (28) through a general flat key c (20) and a general flat key d (29) at one end, the ends of the support rods are located outside the external universal joint inner ring (3), and the two support rods are fixed on both sides of an output end (33) at the other end; the external universal joint outer ring (17) and the external universal joint inner ring (3) realize relative rotation, forming a yawing rotating shaft; a connecting rod (32) is fixed on the top of the cylindrical case (2) at one end, and is fixedly connected to the output end (33) at the other end; the connecting shaft c (21) is respectively connected to an encoder b (18) and a brake b (19) at both ends, the connecting shaft f (28) is connected to a damper b (30) at the outer end, and the encoder b (18), the brake b (19) and the damper b (30) are all fixedly fixed on the outer side of the external universal joint inner ring (3);

on the premise that two input ends of the external cross universal joint (c) and the internal cross universal joint (d) are coaxially connected, two output ends of the external cross universal joint (c) and the internal cross universal joint (d) are coaxially connected to form the rotor following unit (b) of the wrist, the external cross universal joint (c) and the internal cross universal joint (d) have the same rotation center, so that a spherical wrist is formed, motion decoupling with two degrees of freedom of the wrist is realized, and yaw and pitch angles can be measured and controlled separately, the encoder a (4), the brake a (13) and the damper a (12) respectively realize the functions of measuring, braking and changing damping characteristics of pitch rotation, the axis of the rotor following unit (b) is a wrist rotation axis, which realizes fixed point pitch and yaw rotation with two degrees of freedom, and the permanent magnet cylinder with radial magnetization (1) realizes fixed point pitch and yaw rotation with two degrees of freedom of the wrist under the drive of the coaxial following magnetic torque of the spatial universal rotational magnetic field; and the three axis Helmholtz coil assembly (a) comprises a large coil assembly, a small coil assembly and a middle coil assembly, and each assembly comprises two identical coils which are arranged symmetrically; axes of the three coil assemblies are perpendicular to each other, and the three coil assemblies are fixed to each other, wherein the large coil assembly is fixed on the fixed end (e) at the bottom, and the axis of the middle coil assembly is coincident with the axis of the fixed end (e); the internal cross universal joint (d) is located in an internal space in the center of the three coil assemblies, and the external cross universal joint (c) is located outside the three coil assemblies; the external cross universal joint (c), the three axis Helmholtz coil assembly (a) and the internal cross universal joint (d) spatially form a three layers nested structure.

2. A control method for the electromagnetic drive spherical robotic wrist with two degrees of freedom of claim 1, wherein the specific control process is as follows:

(1) posture zero point calibration process before operation the spatial universal rotational magnetic field perpendicular to a rotation axis is generated by the three axis Helmholtz coil assembly (a), the rotor following unit (b) is coincident with the axis of the fixed end (e) under the drive of the coaxial following magnetic torque, at this point, relative angle of the encoder a (4) with the pitch angle and the encoder b (18) with the yaw angle is zero, and also at this point, the encoder a (4) and the encoder b (18) are respectively energized, so that the zero point position of decoupling with two degrees of freedom of the wrist is stored and memorized; when the robotic wrist is positioned, the pitch and yaw rotation is driven to make the robotic wrist in an active wrist mode, and close loop control of an angle position is formed by a control system of the coaxial following magnetic torque according to formula (3), the encoder a (4) and the encoder b (18)

$$T_a = -\frac{m_0 B_0 \sin\alpha}{2} \quad (3)$$

wherein angle $\alpha$ is an included angle between the axis of a permanent magnet cylinder with a magnetic dipole moment of m and the rotation axis of a rotational magnetic field B, and $m_0$ and $B_0$ are amplitudes of a magnetic torque vector and a rotational magnetic vector;

formula (3) shows that the coaxial following magnetic torque of the wrist is controlled simultaneously by the amplitude $I_0$ of a sinusoidal current in the three orthogonal (square) Helmholtz coil assemblies and the included angle $\alpha$ between the axis of the permanent magnet cylinder and the axis of the rotational magnetic field, so as to make the wrist become a compliance wrist;

(2) operation process with two degrees of freedom in active mode step 1: before energizing, always locking the external cross universal joint (c) by the brake a (13) and the brake b (19), so that pitch and yaw rotation cannot be carried out;

step 2: determining the direction of the rotation axis of the spatial universal rotational magnetic field which shall be exerted according to a target spatial orientation, and supplying three alternating currents with equal frequencies to the three axis Helmholtz coil assembly (a) to generate a spatial rotational magnetic field of the corresponding orientation;

step 3: the permanent magnet cylinder with radial magnetization (1) beginning to spin under the action of the rotational magnetic field and generate the coaxial following magnetic torque; however, because the external cross universal joint (c) is locked in two degrees of freedom by the brake a (13) and the brake b (19), the rotor following unit (b) cannot carry out pitch and yaw rotation;

step 4: energizing the brake a (13) and the brake b (19) to release the locking of the external cross universal joint (c); as the permanent magnet cylinder with radial magnetization (1) is under the action of the coaxial following magnetic torque of the rotational magnetic field, the axis of the rotor following unit (b) follows the axis of the rotational magnetic field to carry out pitch and yaw rotation, the pitch angle is measured by the encoder a (4), the yaw angle is measured by the encoder b (18), and damping is provided by the damper a (12) and the damper b (30) during rotation to prevent oscillation;

step 5: feeding back pitch and yaw angle information in real time by the encoder a (4) and the encoder b (18); carrying out feedback control of the coaxial following magnetic torque according to the angle information fed back until accuracy is satisfied, in order to make the wrist reach a target position and realize the control of motion with two degrees of freedom;

step 6: de-energizing the three axis Helmholtz coil assembly (a), de-energizing the brake a (13) and the brake b (19), and locking the external cross universal joint (c) again to fix the orientation of the robotic wrist;

(3) operation process with single degree of freedom in active mode steps 1-3 and step 6 are the same as those in the operation process with two degrees of freedom in active mode, and the rest steps are as follows:

step 4: only energizing the brake a (13) to release the uniaxial locking of the external cross universal joint (c); as the permanent magnet cylinder with radial magnetization (1) is under the action of the coaxial following magnetic torque of the rotational magnetic field, the axis of the rotor following unit (b) follows the axis of the rotational magnetic field to carry out yaw rotation, and the yaw angle is measured by the encoder b (18); or only energizing the brake b (19) to release the uniaxial locking of the external cross universal joint (c); as the permanent magnet cylinder with radial magnetization (1) is under the action of the coaxial following magnetic torque of the rotational magnetic field, the axis of the rotor following unit (b) follows the axis of the rotational magnetic field to carry out pitch rotation, and the pitch angle is measured by the encoder a (4);

step 5: feeding back pitch or yaw angle information in real time by the encoder a (4) or the encoder b (18); carrying out feedback control of the coaxial following magnetic torque according to the angle information fed back until accuracy is satisfied, in order to make the wrist reach a target position and respectively realize the control of motion with single degree of freedom;

(4) coaxial following magnetic torque control in passive mode first, it is assumed that in a plane formed by an acting force vector F at the end of an end effector (f) and the axis of the end effector (f), the direction of a torque generated by F on the wrist rotation center is opposite to the direction of the coaxial following magnetic torque, at this point, the robotic wrist is a direct electromagnetic drive spherical active joint, the principle of electromagnetic drive is a coaxial following magnetic torque effect of the rotational magnetic field, and a calculation formula of the coaxial following magnetic torque is formula 3:

(5) variable stiffness compliance control of wrist first, it is assumed that in the plane formed by the acting force vector F at the end of the end effector f and the axis of the end effector f, the direction of the torque generated by F on the wrist rotation center is opposite to the direction of the coaxial following magnetic torque, at this point, the stiffness of electromagnetic drive spherical joint is:

$$k = \frac{F}{s} \quad (4)$$

wherein s is the deformation at the end of the end effector f along the direction of the acting force, L is the distance from the acting force F at the end of the end effector to the center of an electromagnetic drive spherical robotic joint, then $s=L\alpha$, and $\alpha$ is the included angle between the axis of the permanent magnet cylinder with radial magnetization (1) with the magnetic dipole moment of m and the axis of the rotational magnetic field B;

the torque generated by the acting force F at the end of the end effector f is equal to the coaxial following magnetic torque of the rotational magnetic field:

$$FL = \tfrac{1}{2} m_0 B_0 \sin \alpha \quad (5)$$

substituting (5) into (4) to obtain:

$$k = \frac{m_0 B_0}{2L} \cdot \frac{\sin\alpha}{\alpha} \text{ as } \frac{\sin\alpha}{\alpha} \approx 1, \text{ then: } k = \frac{m_0 B_0}{2L} \quad (6)$$

formula (6) shows that the stiffness of the wrist is linearly controlled by the amplitude $B_0$ of the rotational magnetic vector, controlled by the amplitude $I_0$ of the sinusoidal current in the three orthogonal (square) Helmholtz coil assemblies, so as to make the wrist become a compliance wrist.

* * * * *